US006491048B1

(12) United States Patent
Foster

(10) Patent No.: US 6,491,048 B1
(45) Date of Patent: Dec. 10, 2002

(54) MANIFOLD FOR USE IN CLEANING COMBUSTION TURBINES

(75) Inventor: Charles D. Foster, Keyser, WV (US)

(73) Assignee: HydroChem Industrial Services, Inc., Deer Park, TX (US)

( * ) Notice: Subject to any disclaimer, the term of this patent is extended or adjusted under 35 U.S.C. 154(b) by 0 days.

(21) Appl. No.: 09/579,619

(22) Filed: May 26, 2000

(51) Int. Cl.[7] .................................................. B08B 3/02
(52) U.S. Cl. .............................. 134/169 A; 134/166 R; 134/199; 134/198; 134/200
(58) Field of Search ........................... 134/199, 167 R, 134/168 R, 166 R, 169 R, 169 A, 198, 200

(56) References Cited

U.S. PATENT DOCUMENTS

| | | | |
|---|---|---|---|
| 3,335,916 A | * | 8/1967 | Juniper |
| 3,396,538 A | * | 8/1968 | Wetherbee, Jr. |
| 4,059,123 A | | 11/1977 | Bartos et al. |
| 4,065,322 A | | 12/1977 | Langford |
| 4,196,020 A | | 4/1980 | Hornak et al. |
| 4,670,062 A | * | 6/1987 | Lester |
| 4,808,235 A | | 2/1989 | Woodson et al. |
| 5,011,540 A | | 4/1991 | McDermott |
| 5,090,205 A | * | 2/1992 | Foster |
| 5,575,858 A | * | 11/1996 | Chen et al. |
| 5,679,174 A | * | 10/1997 | Buongiorno |
| 5,758,486 A | * | 6/1998 | Fetescu |
| 5,899,217 A | * | 5/1999 | Testman, Jr. |
| 5,938,855 A | * | 8/1999 | Bowden, Jr. |
| 5,944,483 A | * | 8/1999 | Beck et al. |
| 6,073,637 A | * | 6/2000 | Haywood et al. |
| 6,310,022 B1 | * | 10/2001 | Amiran |
| 6,311,704 B1 | * | 11/2001 | Foster |

FOREIGN PATENT DOCUMENTS

| | | | |
|---|---|---|---|
| GB | 2074048 | * | 10/1981 |
| JP | 59-77010 | * | 5/1984 |
| JP | 9-170705 | * | 6/1997 |
| JP | 9-294947 | * | 11/1997 |

OTHER PUBLICATIONS

Scheper, "Maintaining Gas Turbine Compressors for High Efficiency", Power Engineering, Aug. 1978, pp. 54–57.
Elser, "Experience Gained in Cleaning the Compressors of Rolls–Royce Turbine Engines", Brennst.–Warme–Kraft, vol. 25, Sep. 1973, pp. 347–348.

* cited by examiner

*Primary Examiner*—Frankie L. Stinson
(74) *Attorney, Agent, or Firm*—Shook, Hardy & Bacon LLP; Walter R. Brookhart

(57) ABSTRACT

The present invention is directed to a manifold for temporarily blocking the air intake of the compressor section of a combustion turbine to facilitate cleaning. A manifold suitable for providing a temporary seal about the air intake of the compressor section and through which a foamed cleaning solution can be pumped is disclosed. The manifold is conveniently provided as a flexible manifold body having an inflatable tubular member along the periphery thereof for sealing with the air intake and a plurality of hose connections through which a foamed cleaning solution can be delivered to the compressor section of the combustion turbine. Particulate films and contaminants adhering to the internal components of the compressor section of a turbine are readily removed by pumping a foamed cleaning solution such as a foamed, aqueous surfactant solution through the manifold and into the compressor section. Contaminants resulting from fuel combustion and deposited in the combustion and turbine sections are removed by pumping a second, foamed cleaning solution through those sections. The second solution typically comprises a foamed, aqueous acid solution optionally including a corrosion inhibitor. The compressor section must be isolated from such acid solutions, e.g. by pumping the foamed surfactant solution through the manifold and compressor section prior to and simultaneously with pumping the foamed acid solution through the combustion section.

20 Claims, 4 Drawing Sheets

MANIFOLD FOR USE IN CLEANING COMBUSTION TURBINES

BACKGROUND OF THE INVENTION

I. Field of the Invention

The present invention generally relates to an apparatus useful with methods for cleaning combustion turbines. The present invention is useful with methods for cleaning contaminants adhering to the internal surfaces of the compressor, combustion and turbine sections of a combustion turbine by pumping one or more foamed cleaning solutions therethrough. More specifically, the present invention is directed to a manifold for temporarily blocking the air intake opening of the compressor section of a combustion turbine to facilitate such cleaning.

II. Description of the Background

Combustion turbines are used in a multitude of applications, including aviation, shipping, chemical processing and power generation. In combustion turbine power generation facilities, efficiency can be improved by supplementing the electrical power generated directly from the combustion turbine with recovery units designed to capture heat from the exhaust gas generated by the turbine. This heat can be used to produce steam to drive a steam turbine, operate steam driven equipment or provide heat to chemical processing facilities, thus improving the efficiency of the power generation facilities.

As used herein, the term combustion turbine refers to any turbine system having a compressor section, a combustion section and a turbine section. The compressor section is designed to compress the inlet air to a higher pressure. Atomized fuel is injected into the combustion section where it is combined with the compressed inlet air and oxidized. Finally, the energy from the hot gasses produced by oxidation of the fuel is converted to work in the turbine section. While fuels typically comprise natural and synthetic gases (mostly methane), other hydrocarbons, including liquified natural gases (LNG), butane, kerosene, diesel and fuel oils may be employed. The expanding combustion gases power the turbine by turning the rotating blades of the turbine sections as they escape the combustion section. The compressor section is mechanically powered by a rotor comprising a rotor shaft with attached turbine section rotating blades and attached compressor section rotating blades. In power generation facilities, the rotor drives an associated electrical generator. Alternatively, the rotor may be used to power chemical process equipment. While the exhaust gas may merely be discarded, preferably it is recovered as additional heat energy often being used to produce steam in power generation facilities.

The overall efficiency of a combustion turbine engine is heavily dependent on the efficiency of the compressor. The pressure ratio of the compressor, i.e., the ratio of air pressure at the compressor outlet to air pressure at the air inlet, is one of the significant parameters which determines the operating efficiency of the compressor. The higher the pressure ratio at a given rotational speed, the greater the efficiency. The higher the air pressure at the outlet of the compressor, the greater the energy available to drive the turbine downstream of the compressor and hence to generate power or produce thrust.

In axial flow compressors, pressurization of air is accomplished in a multiplicity of compressor stages or sections, each stage being comprised of a rotating multi-bladed rotor and a non-rotating multi-vaned stator. Within each stage, the airflow is accelerated by the rotor blades and decelerated by the stator vanes with a resulting rise in pressure. Each blade and vane has a precisely defined airflow surface configuration or shape whereby the air flowing over the blade or vane is accelerated or decelerated, respectively. The degree of air pressurization achieved across each compressor stage is directly and significantly related to the precise air foil surface shape. Unfortunately, the surfaces of the compressor blades and vanes become coated with contaminants of various types during use. Oil and dirt sucked in through the air intake become adhered to the blade and vane surfaces of the compressor.

Deposits build up on compressor blades during normal operation causing reduced airflow through the compressor section of combustion turbines. Such deposits are often the result of the ingestion of hydrocarbon oils and greases, smoke, dust, dirt and other particulate air pollutants through the air intake of the combustion turbine. Upon formation of a hydrocarbon film upon the internal surfaces, including both the rotating blades and stationary vanes, of the compressor, additional particulates pulled through the compressor become trapped. As the airflow through the compressor section diminishes, the compressor discharge pressure drops, resulting in a reduction in compressor efficiency and power output from the turbine. The resulting inefficiency causes an increase in fuel consumption and a loss in power generation output.

Aluminum and other metal substances erode from other parts, e.g., clearance seals of the engine, and are also deposited on the blades and vanes. Metals contained in the fuel, particularly heavy metals such as magnesium and vanadium, deposit on the combustion and turbine blades and vanes. All of these surface deposits alter the ideal air foil surface shape, disturbing the desired air flow over the blades and vanes. This results in a reduction in the pressure rise across each successive turbine stage and a drop in overall turbine efficiency.

Gas turbine compressors have been periodically cleaned to remove the build up of particulates on internal components. Some of this cleaning has been performed without full shutdown of the combustion turbine, while other cleaning methods have required not only full shutdown, but even disassembly of the turbine. Materials used in such cleaning operations have included water, ground pecan hulls, coke particles and chemical cleaning mixtures which have been sprayed, blown or otherwise injected into the inlet of the combustion turbine after it has been configured for such a cleaning operation.

Removal of contaminants from the blades and vanes of in service compressors is desirable to restore compressor and engine efficiency. Since it is both time consuming and expensive to disassemble the engine, methods capable of removing these contaminants without disassembly of the engine are desirable. Furthermore, any method utilized to remove the contaminants must not interfere with the structural or metallurgical integrity of the components of the engine. Acceptable methods must be capable of removing the contaminating materials without attacking engine components constructed of similar materials. Because many liquid solvents also attack the engine components, the injection of liquid solvents into the engine has often proven to be unacceptable.

Abrasive particles impinging upon the contaminated surfaces will also dislodge contaminants. However, abrasive materials have proven to be unsatisfactory. Such materials are often overly abrasive, not only dislodging contaminants but also destroying the surface smoothness of the blades and vanes. Furthermore, some of these abrasive materials generally remain within the engine. If non-combustible, these materials may clog cooling holes of the turbine components and restrict needed cooling airflow. If combustible, these materials may produce residues which clog the cooling holes.

A general discussion of compressor section cleaning may be found in Scheper, et al. "Maintaining Gas Turbine Compressors for High Efficiency," *Power Engineering*, August 1978, pages 54–57 and Elser, "Experience Gained in Cleaning the Compressors of Rolls-Royce Turbine Engines," Brennst-Warme-Kraft, Sep. 5, 1973, pages 347–348. Several exemplary prior art cleaning methods are described in more detail below.

Many prior art methods merely sprayed water into the air intake of an operating combustion turbine. U.S. Pat. No. 4,196,020 to Hornak, et al. discloses a wash spray apparatus for use with a combustion turbine engine. The apparatus includes a manifold having a plurality of spray nozzles symmetrically disposed about the air intake of a combustion turbine engine. Water is sprayed under pressure from these nozzles into the inlet of the compressor during operation. The inlet air is used to carry the atomized water mist through the turbine. Some of the deposits, generally those at the front of the compressor, are contacted by the water and washed away, resulting in some improvement in efficiency. A similar system is disclosed by McDermott in U.S. Pat. No. 5,011,540. The McDermott patent discloses a manifold having a plurality of nozzles for mounting in front of the air intake of a combustion turbine. McDermott proposes that a cleaning solution be injected into the air intake as a cloud dispersed in the less turbulent air found at the periphery of the intake. McDermott asserts that dispersal in the less turbulent air improved cleaning. Similar water injection systems are available from turbine manufacturers for installation during construction of the turbine. Alternatively, these systems may be purchased as aftermarket items.

It has been observed, however, that water washes such as those described above only clean the first few rows of compressor blades and vanes. It is believed that this phenomenon is the result of both the high temperature and centrifugal forces generated in the operating compressor. These conditions cause the water to be thrown to the outside of the turbine and to be evaporated before effective cleaning throughout the length of the compressor section can be achieved. Further, water washes provide no benefit with respect to fouling occurring in the combustion and turbine sections of the turbine.

Attempts to improve cleaning efficiency resulted in the development of higher boiling cleaning solutions. For example, U.S. Pat. No. 4,808,235 to Woodson, et al. discloses cleaning fluids having relatively low freezing points, together with higher boiling points, to improve penetration and cleaning of the back rows of compressor blades. Woodson suggested that cleaning solutions comprising glycol ethers would provide improved cleaning throughout the length of the axial compressor. While addressing the evaporation problem, however, Woodson's solution did not solve the problem resulting from centrifugal forces developed as the turbine spins during operation.

Other attempts to improve cleaning efficiency were directed to off-line methods. Systems similar to those just described were employed in conjunction with more rigorous off-line chemical cleaning procedures. During these operations, the unit is not fired. Atomized cleaning solutions, typically aqueous surfactant solutions, were drawn through the compressor by spinning the unit at a speed of about 1,000 RPM. While more effective than the previously described on-line cleaning procedures, the unit must be taken out of service, thus, increases costs through loss of output during the cleaning operation.

Some prior art systems employed abrasive particles in off-line cleaning. Unfortunately, non-combustible abrasive particles often clogged small cooling holes in the turbine blades, while combustible particles produced further residues on the blades. In an effort to overcome those deficiencies, U.S. Pat. No. 4,065,322 to Langford suggested that abrasive particles of coke having a carbon content of at least 70 percent-by-weight and a volatile matter content of less than 8 percent-by-weight be entrained in the inlet airstream and directed to impinge upon the contaminated surfaces. While these combustible coke abrasives avoided many of the problems found with prior art abrasive particles, they still did not provide a complete and full cleaning of the internal surfaces.

Accordingly, those skilled in the art have continued to seek improved methods for cleaning combustion turbines. Desirable methods should be capable of cleaning the blades and vanes throughout the length of an axial compressor and also of cleaning the blades and vanes in the combustion and turbine sections of the engine. Further, acceptable methods must not attack the engine components themselves. Thus, there has been a long felt but unfulfilled need for improved and more efficient methods for cleaning contaminants from combustion turbine engines. The present invention solves those needs.

SUMMARY OF THE INVENTION

The present invention is directed to a manifold for temporarily blocking the air intake of the compressor section of a combustion turbine to facilitate the cleaning methods of the present invention. The present invention is useful with methods for removing contaminants, including films, particulates, metals and other combustion products deposited in the compressor, combustion and turbine sections of a combustion turbine. In those methods, a foamed cleaning solution is pumped through the air intake of the compressor section of the turbine so that the compressor section is filled with the foamed solution.

The manifold of the present invention provides a means for temporarily blocking the air intake opening of the compressor section of a combustion turbine. In an embodiment designed for use with an axial, bell-shaped air intake, the manifold comprises a bonnet for completely covering the air intake opening of the compressor section of the combustion turbine. The manifold includes means disposed about the periphery of the bonnet for producing a temporary seal with the air intake opening. Finally, the manifold includes at least one connection through the bonnet through which a foamed cleaning solution can be delivered through the air intake to the compressor section.

In the preferred embodiment, the means for producing a seal comprises a resiliently deformable band, preferably an elastic band, most preferably an inflatable tube, disposed about the periphery of the body, which, when inflated, provides an effective seal therewith. In a preferred embodiment, at least a portion of the bonnet is flexible, being comprised of a deformable material, preferably a resiliently deformable, natural or synthetic elastomer. In order to increase the volume of foam input to the compressor, the manifold preferably includes a plurality of symmetrically disposed connections. In the most preferred embodiment, the flexible body is generally circular in shape having an inflatable, tubular ring disposed about the periphery thereof for providing a seal about the bell-shaped air intake opening of an axial compressor.

In an alternative embodiment, a manifold for providing a temporary blockage of a radially outwardly opening air intake or an air intake having a generator driven from the intake end of the turbine is provided. Such a manifold comprises a manifold body having two, substantially parallel sides. The manifold further includes means disposed along each substantially parallel side for sealing with the outwardly opening air intake, together with at least one connection through the manifold body through which a foamed cleaning solution can be delivered through the air intake to the compressor section. The manifold body is generally cylindrical in shape or, alternatively, includes releasable fastening means for forming the body into a cylindrical shape after installation. Again, the means for sealing may comprise resiliently deformable bands, preferably elastic bands, more preferably comprising inflatable tubular members extending along the periphery of the parallel sides of the body. In the methods of the present invention, a foamed cleaning solution is prepared. Because the main contaminants in the compressor section are oils, greases and other hydrocarbons, along with entrapped dirt and dust, ingested with the air, an aqueous solution of a surfactant and a foaming agent, is preferred. The foamed cleaning solution is pumped through the air intake into the compressor section of the combustion turbine. The foamed solution penetrates and fills all of the cavities of the compressor section of the turbine, thus bringing the solution into contact with contaminants covering all of the surface area of the blades and vanes disposed in the compressor section. Accordingly, a more thorough cleaning is obtained. After passing through the compressor section, the foamed cleaning solution passes through the combustion and turbine sections where additional soluble contaminants, are removed. Upon exiting the turbine section, the solution is contacted with an anti-foaming agent to break the foam to a liquid. The liquid is then drained or removed from the turbine by any appropriate means.

In a preferred embodiment of the present method, a second, foamed cleaning solution suitable for removing contaminants produced during the combustion process and deposited on the internal surfaces on the combustion and turbine sections is prepared. These contaminants often include heavy metals and their oxides, together with shellacs, varnishes and other hard combustion residues. Accordingly, preferred cleaning solutions include aqueous solutions of an acid and a foaming agent. Suitable acids include both organic and inorganic acids. Particularly preferred are dilute solutions of the mineral acids. These solutions often include an appropriate corrosion inhibitor. Because the acidic cleaning solutions are typically not needed to remove contaminants from the compressor section and because these stronger solutions may attack and damage the vanes and blades therein, these stronger cleaning solutions should be prevented from entering the compressor section. In a preferred embodiment, this goal is accomplished by initially filling the compressor section with a first, foamed cleaning solution appropriate for cleaning the compressor section and continuing to pump that first solution through the compressor section while pumping the second, stronger cleaning solution through the combustion and turbine sections.

Cleaning may continue until the prepared cleaning solutions are exhausted. However, in a preferred method, the removed liquid is monitored for one or more contaminants, including metal content, to determine the progress of the cleaning. Cleaning is stopped upon reaching a predetermined value in the monitored contaminant.

The prepared foams provide acceptable cleaning results throughout a wide temperature range. While they typically function throughout the full temperature range where the underlying solution is liquid, i.e., from about 32° F. to about 212° F. for aqueous solutions, they are most often used at temperatures ranging from ambient, i.e., about 40–80° F., to about 200° F. Because the effectiveness of most cleaning solutions is improved at higher temperatures, most foam solutions are used at a temperature of about 150–180° F. for maximum efficiency.

While the pumping rate for the foamed solutions can vary greatly, depending, in part, on the consistency on the foam, preferred pumping rates for most foams are in the range of about 5–50 gallons per minute, more preferably about 10–20 gallons per minute and most preferably about 15 gallons per minute.

While it not necessary to turn the turbine during the cleaning operation, it is believed that penetration of the foam is improved by slow cranking of the turbine. Accordingly, it is preferred that the turbine be turned at a speed not exceeding about 10 RPM, preferably about 5 RPM during the pumping operations.

At the conclusion of the cleaning operation the foamed cleaning solutions remaining within the turbine are easily removed by rinsing the turbine with a foamed water rinse. Finally, the turbine may be dried before being returned to service by spinning at a speed and for a time sufficient to dry the turbine, typically about 500–1500 RPM and preferably about 1,000 RPM for about 10–30 minutes.

When installed, the manifold of the present invention provides a convenient means for pumping a foamed cleaning solution through the compressor section of a combustion turbine to perform the cleaning methods of the present invention. By employing the cleaning methods of the present invention, contaminants in both the compressor section and in the combustion and turbine sections of a combustion turbine are conveniently and effectively removed in order to improve the compressor and turbine discharge pressures and the turbine power output, thus improving the efficiency and economy of the combustion turbine.

Thus, the long felt, but unfulfilled need for improved methods for cleaning combustion turbines has been met. These and other meritorious features and advantages of the present invention will be more fully appreciated from the following description and claims.

BRIEF DESCRIPTION OF THE DRAWINGS

Other features and intended advantages of the present invention will be more readily apparent by reference to the following detailed description in connection with the accompanying drawings wherein.

While the invention will be described in connection with the presently preferred embodiment, it will be understood that this is not intended to limit the invention to that embodiment. To the contrary, it is intended to cover all alternatives, modifications and equivalents as may be included in the spirit of the invention as defined in the appended claims.

DETAILED DESCRIPTION OF THE PREFERRED EMBODIMENT

The present invention provides a manifold useful with improved methods for removing contaminants deposited on the blades and vanes of the compressor, combustion and turbine sections of a combustion turbine. The present invention provides improved, off-line methods for cleaning such turbines by using a manifold to pump a foamed cleaning solution through the air intake of the combustion turbine.

Figure 1:
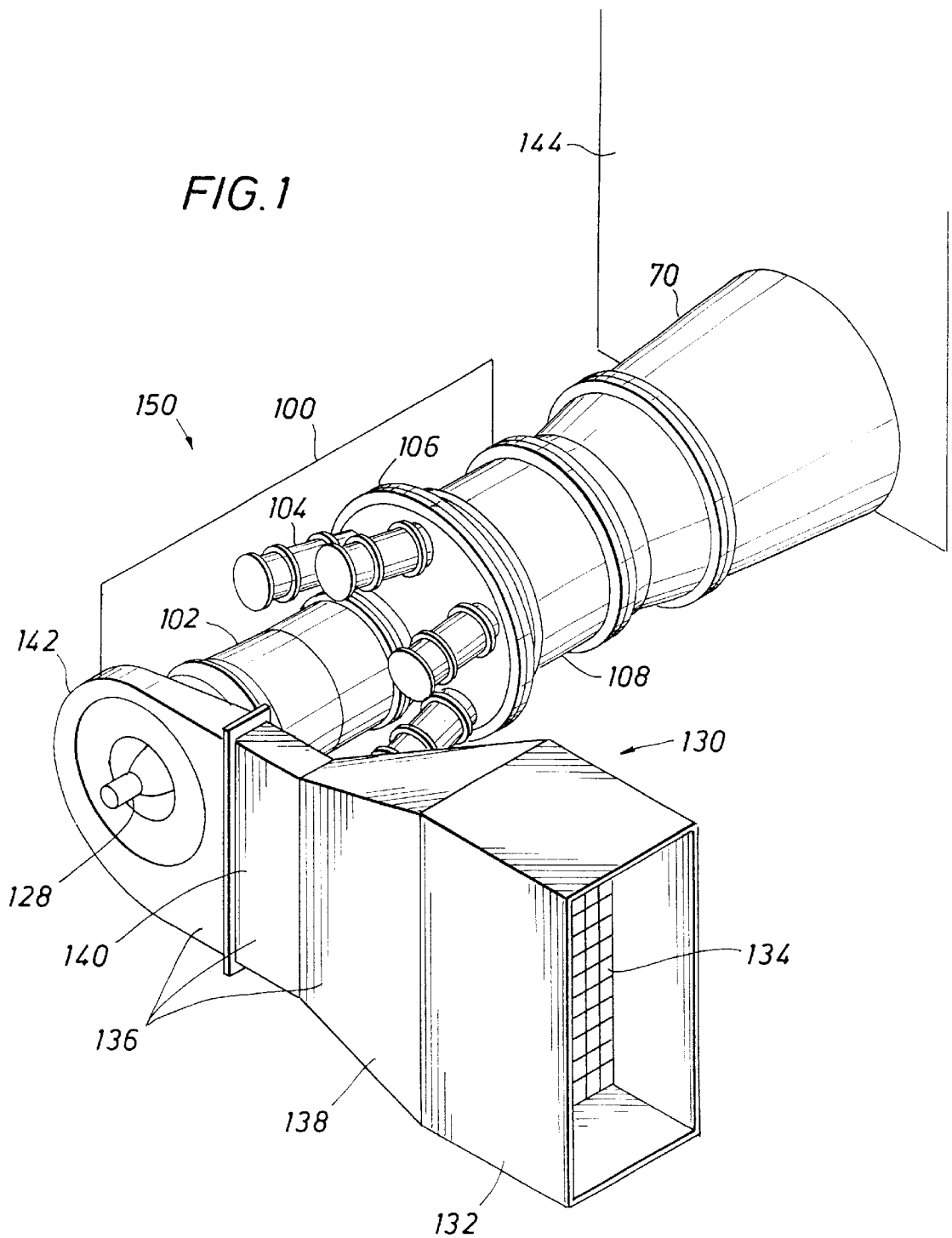
FIG. 1 provides an overview of a typical combustion turbine power generation facility (the affiliated electric generator is not actually shown in FIG. 1, but is presumed to be apparent) used to generate electric power from the combustion of fuel with air.

The present invention is readily understood by reference to the operation of an otherwise conventional, combustion turbine power generation facility such as illustrated in FIG. 1. FIG. 1 provides an overview of a combustion turbine power generation facility 150. Combustion turbine engine 100 is employed to generate electric power from the combustion of fuel with air. For simplicity, the associated electric generator is not illustrated in FIG. 1.

Depending on the installation, the electric generator can be driven from either the intake end of turbine engine 100 via shaft 128 or from the exhaust end (not shown). Combustion turbine engine 100 draws air from air intake system 130. System 130 comprises filter room 132 having one or more walls comprised of inlet air filters 134. Filter room 132 is connected via air duct system 136 to the compressor section 102 of combustion turbine 100. Inlet air duct system 136 is comprised of a convergent portion 138, a constricted flow portion 140 and an inlet air duct manifold portion 142. Access to the inlet air passage of compressor section 102 may be obtained by entry into the air duct system 136 through a small door (not shown) or by temporarily removing manifold portion 142.

In addition to compressor section 102, combustion turbine 100 includes a plurality of fuel atomization chambers 104 leading to combustion section 106 and turbine section 108. Finally, hot gasses are expelled through exhaust section 70 to heat recovery unit 144 where steam may be generated from the exhaust gases of combustion turbine 100. Common uses for the steam generated in heat recovery unit 144 are the generation of electric power from a steam turbine, operation of steam driven equipment or delivery of heat to chemical processing facilities.

Figure 2:
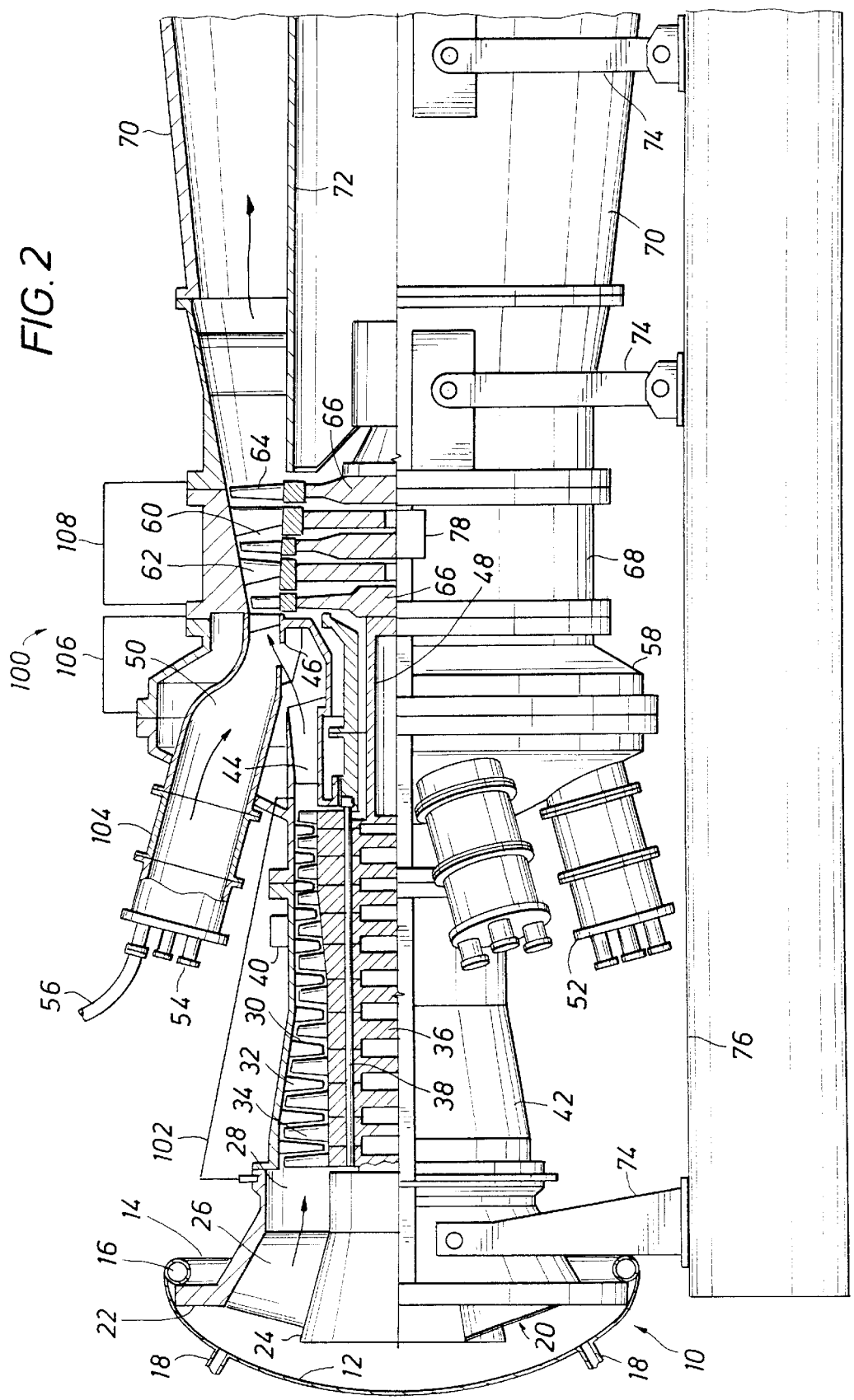
FIG. 2 is a partial cross section illustrating an exemplary combustion turbine engine having an axial compressor with an axial air intake.

Turning now to FIG. 2, an exemplary combustion turbine suitable for cleaning by the methods of the present invention is illustrated in further detail. Combustion turbine engine 100 is illustrated mounted upon skid 76 using a plurality of mounting brackets 74. Combustion turbine 100 comprises compressor section 102 for compressing air drawn through axial compressor inlet 20. Fuel injected into atomization chamber 104 is mixed with compressed air and oxidized in combustion chamber 50 within combustion section 106. Work is extracted from the resulting hot gasses in turbine section 108 prior to their expulsion as exhaust gases through exhaust section 70.

The compressor air inlet comprises axial compressor inlet 20 formed between bell-shaped inlet shell 22 and air axial inlet shield 24. Inlet air is directed around a series of first stage stators or support vanes 26 through inlet air passage 28 to compressor chamber 30. The air is compressed in axial compressor section 102 by passage through a series of compressor stages 40, each stage comprising a plurality of stationary compressor stator vanes 32 disposed symmetrically about a segment of compressor shield 42 and a plurality of rotating compressor rotor blades 34 disposed symmetrically about the circumference of a compressor rotor disc 36. The compressor comprises a plurality of stages 40 with the output of each stage being the input of the next. A corresponding plurality of compressor discs 36 with associated blades 34, secured together by a plurality of rods 38 and fixed to rotor shaft 128 comprises the rotating portion of the compressor found within compressor housing 42.

After compression in axial compressor section 102 through operation of a series of compressor stages 40, the compressed air flows through air passage 44 and combustion section inlet 46 into combustion chamber 50 for mixing with fuel atomized by fuel injectors 54 in fuel atomization chamber 104. As illustrated, each atomization chamber 104 includes three injectors 54 mounted in fuel atomization unit 52. For simplicity, fuel lines leading from a fuel source, e.g., a hydrocarbon gas or liquid, to the injectors, have not been illustrated. Exemplary fuel sources include natural and synthetic gases (most preferably methane), liquified natural gas, kerosene, diesel and fuel oil, all of which are readily vaporized or atomized in chamber 104.

The atomized or vaporized fuel is burned in combustion chamber 50 disposed within combustion housing 58. Burning of the fuel mixed with the compressed air generates hot, pressurized gases for use in driving turbine section 108. These hot gases pass into turbine chamber 60 within turbine housing 68 passing over stationary turbine stator vanes 62 and rotating turbine rotor blades 64 disposed about the periphery of turbine rotor discs 66. In many cases, the turbine section rotor blades 64 and stator vanes 62 have multi-layered surfaces or coated surfaces to enable the use of higher temperature hot gases. Turbine section 108 includes a series of turbine stages 78 which incrementally convert the energy of the hot pressurized gas into work manifested by rotation of rotor shaft 128. Rotating discs 66, attached to rotor shaft 128 and coupled through rotor shaft 48 to compressor discs 36 also provide the driving force for compressor section 102.

Turbine section 108 provides an exhaust gas having lower temperature and pressure than the hot pressurized gas which exited combustion section 106. The exhaust gas exits turbine 100 via the passage formed between exhaust housing 78 and central exhaust shield 72. The heat still remaining in this gas is often recovered in heat recovery unit 144.

In the methods of the present invention, a foamed cleaning solution, typically comprising an aqueous solution of a surfactant is pumped through compressor section 102 as illustrated by the arrows. Many surfactants can be adequately foamed without addition of a separate foaming agent. However, if desired, a separate foaming agent can be included.

Those skilled in the art will be adept at selecting a suitable surfactant based upon an initial analysis of the contaminants present. Suitable surfactants include the anionic, cationic, nonionic and Zwitterionic surfactants and mixtures thereof.

Exemplary anionic surfactants include sodium alkyl diphenyl oxide sulfonates, sodium naphthalene sulfonate, sodium dodecyl sulfate and sodium dodecyl benzenesulfonate. Cationic surfactants include laurylamine hydrochloride and cetyltrimethylammoniumbromide. Poly(oxyethylene) alcohols and alkylphenol ethoxylates are exemplary nonionic surfactants. Finally, appropriate Zwitterionic surfactants may include lauramidopropylbetaine and cocoamido-2-hydroxypropylsulfobetaine.

Conventional methods, including application of compressed air and/or nitrogen, are employed to produce the required foamed solutions. While many surfactants will produce adequate foams without the addition of a foaming agent, improved foams can often be produced with addition of appropriate foaming agents. Exemplary foaming agents include the alkanolamides, alkylphenol ethoxylates, cocoamido-2-hydroxypropylsulfobetaine, lauramidopropylbetaine, poly(oxyethylene) alcohols, poly(oxypropylene) alcohols, canolamidopropyl ethyldimonium ethosulfate, potassium cocoyl hydrolyzed collagen, polysiloxane polyether copolymers, cocoamidopropyl betaine, gelatin, PG-hydroxyethylcellulose cocodimonium chloride and mixtures thereof.

Figure 3:
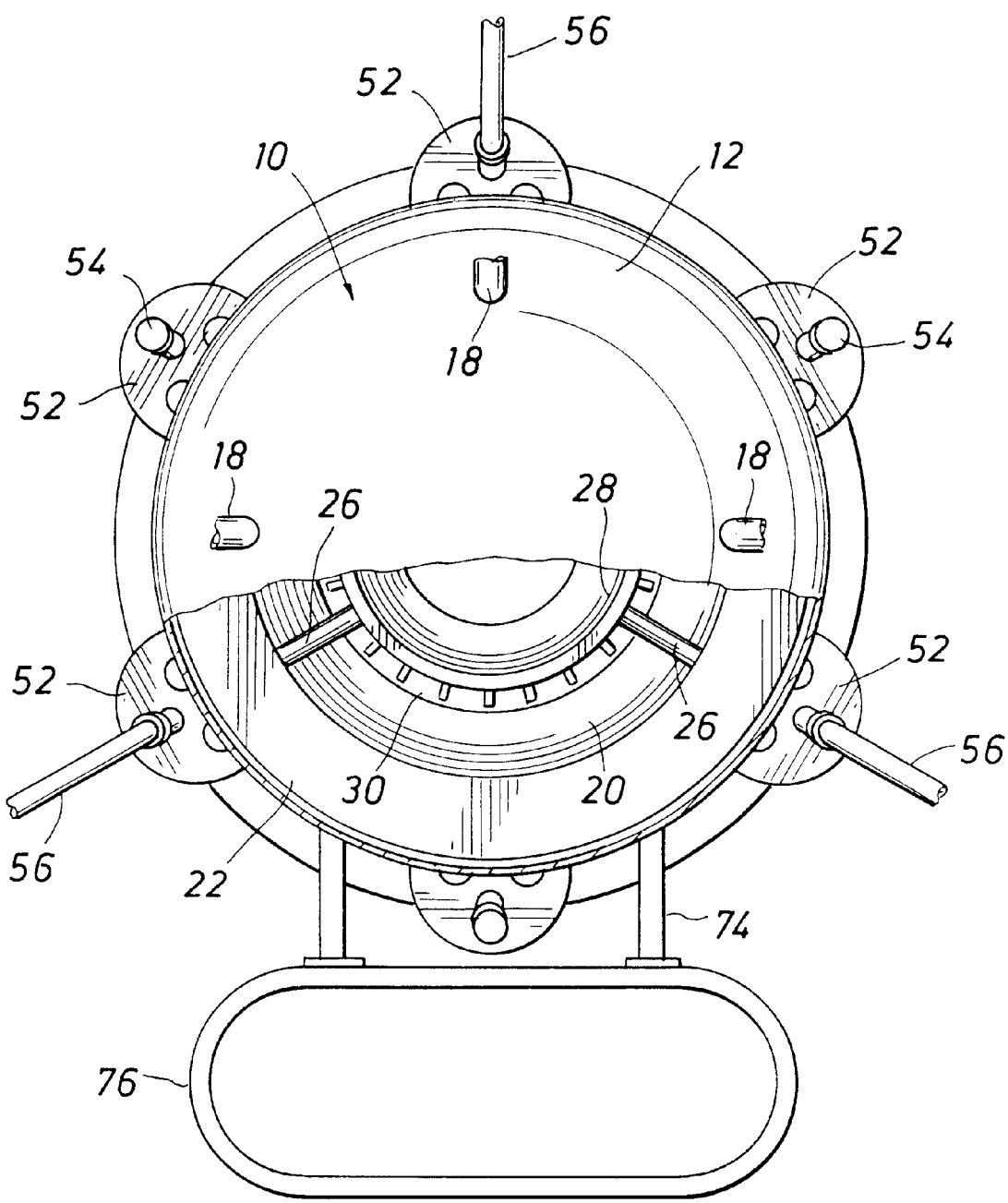
FIG. 3 illustrates the combustion turbine engine of FIG. 2 as viewed from the left looking into the compressor air intake and illustrating a manifold for injecting foam therein.

In the methods of the present invention, a manifold 10 is placed over axial compressor inlet 20 for delivering the foamed cleaning solution to compressor section 102. A presently preferred manifold for use with an axial compressor in the methods of the present invention is illustrated in FIGS. 2 and 3. Manifold 10 comprises bonnet 12 for completely covering the air intake opening 20 of compressor section 102. At least a portion of bonnet 12 preferably is flexible in orderto permit installation about air intake 20 within the cramped confines of intake filter system 130. Bonnet 12 is typically circular in shape and may conveniently be comprised of a cloth coated with a natural or synthetic elastomer. Alternatively, bonnet 12 is formed of a resiliently deformable material, e.g., a synthetic or natural elastomer. Disposed about the periphery of bonnet 12 is a means for forming a temporary seal with compressor inlet shell 22. One means of providing the required seal is illustrated by an elastic band 14 disposed about the periphery of manifold 10. In the preferred embodiment, illustrated in FIG. 2, resilient band 14 actually comprises an inflatable tube 16 which, when inflated, provides the required seal. Finally, manifold 10 includes a plurality of symmetrically disposed hose connections 18 through which a foamed cleaning solution may be pumped into the compressor section 102 through air intake 20. Hose connections 18 preferably have a diameter of about two inches and are adapted for connection to conventional foam delivery lines.

Figure 4:
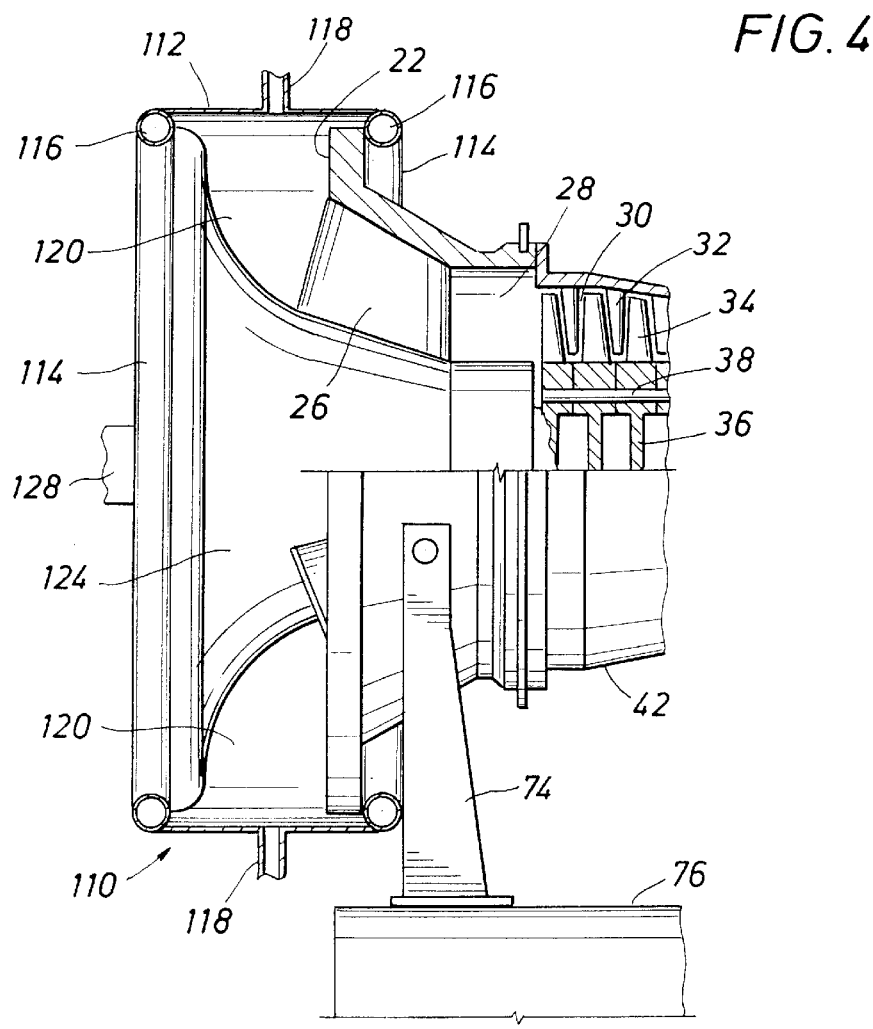
FIG. 4 is a partial cross section of the air intake of an axial compressor having a radially outwardly opening air intake and illustrating a manifold for injecting a foamed cleaning solution therein.

FIG. 4 illustrates an alternative embodiment of the manifold of the present invention intended for use with a radially outwardly facing air intake encountered in some installations. The air intake opening of radial compressor inlet 120 is defined by compressor inlet shield 22 and radial compressor inlet shield 124, resulting in an outwardly facing air intake extending a full 360° around the compressor opening. Manifold 110 comprises manifold body 112 having two substantially parallel sides for covering the radially outwardly opening air intake 120 of compressor section 102. Manifold 110 further includes at least one hose connection 118 through manifold body 112 through which a foamed cleaning solution can be delivered through air intake 120 to compressor section 102. Preferably, a plurality of connections 118 are disposed symmetrically about manifold 110.

Affixed along each parallel side of manifold 110 is a means for temporarily producing a seal with the outwardly opening ends of shields 22 and 124. Acceptable seal means include resiliently deformable members affixed along the periphery of each of the parallel sides of manifold 110. Bands 114, preferably comprising a natural or synthetic elastomer, and most preferably comprising an inflatable tube 116 have been found to provide satisfactory and convenient means for producing the required seal.

In a preferred embodiment, manifold 110 comprises a cylindrical body of the appropriate size body 112 having inflatable, tubular members 116 affixed on each end thereof for rapid installation and removal. Because combustion turbines 100 come in many sizes, having air intakes of varying diameter, a number of manifolds 110 of varying size may be required. Alternatively, a manifold 110 having an adjustable circumference is readily produced from an elongated manifold body 112 having releasable fastening means, e.g., a Velcro-type fastener, disposed between inflatable tubular members 116 affixed along its parallel sides. Such a manifold 110, can be positioned around a radially outwardly opening intake 120, engaging the releasable fastener to produce a manifold 110 of any required circumference.

Figure 5:
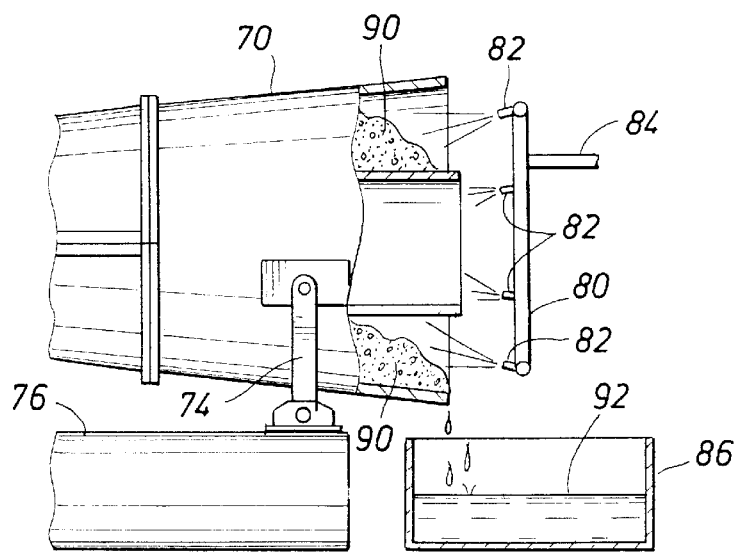
FIG. 5 is a partial cross section of the exhaust end of a combustion turbine illustrating an exemplary manifold for collapsing foam exiting therefrom.

While some foams will collapse on their own, it is preferred that the foam exiting the turbine be collapsed to facilitate waste recovery. Turning to FIG. 5, an exemplary anti-foam manifold 80 is illustrated. Manifold 80 comprises a plurality of nozzles 82 connected via manifold 80 to hose 84 for supplying a conventional anti-foaming agent.

Those skilled in the art will be able to select an appropriate anti-foaming agent from conventional chemicals. Exemplary anti-foaming agents include blends of hydrocarbons and fatty derivatives, blends of organic esters and mineral oils, fatty esters in hydrocarbons, linear saturated $C_{16-18}$ alcohols, oleyl alcohols, polydimethylsiloxane polymers, silica filled polydimethyl siloxane, glycol ester, and ethoxylated tetramethyl decynediol and mixtures thereof.

Nozzles 82 deliver a spray of anti-foaming agent to collapse the foam 90 exiting exhaust section 70 to a liquid 92 recovered in drain 86. An alternative foam breaking system may simply comprise a tube having a series of holes therein inserted through a port in the top of exhaust housing 70 for delivering a spray to exiting foam 90 which can be recovered through a drain (not shown) in the bottom of housing 70.

In operation, combustion turbine 100 is taken off-line and cooled to the temperature range desired for cleaning. While aqueous foamed cleaning solutions function over a broad temperature range, typically extending from about the freezing to about the boiling point of the underlying solutions, most cleaning operations are conducted at temperatures from ambient, i.e., about 40–80° F. to about 200° F. However, in order to maximize efficiency, the preferred temperature range for most cleaning solutions is about 150–180° F. After manifold 10 or 110 is installed over axial compressor inlet 20 or 120, tubular member(s) 16 or 116 are inflated to provide an appropriate seal.

The desired cleaning solution, e.g., an aqueous, surfactant solution, is prepared. The solution is foamed just prior to use by mixing the prepared aqueous solution with compressed air at the proper ratio to generate a foamed solution having the consistency of shaving cream. Any conventional cleaning solution appropriate for removal of the specific contaminants in the compressor section, typically oils, greases, dust and entrapped particulates may be employed. Those skilled in the art are adept at selecting, preparing and producing such solutions in the desired consistency.

If desired, certain piping systems and drains may be isolated to prevent unwanted migration of the cleaning solution. An anti-foam injection manifold (see FIG. 5) is installed within the exhaust housing to break the foamed solvent to a liquid for removal. Drains are positioned for adequate drainage during and after the chemical cleaning. Finally, the system may be tested for leaks by pumping a foamed water solution therethrough at about 15 gallons per minute.

With reference to FIG. 2, cleaning is commenced by pumping the foamed cleaning solution through hose connections 18 in manifold 10 and into compressor section 102 through compressor inlet 20 as indicated by the arrow. The foamed solution passes through compressor section 102, removing deposits adhering to the internal surfaces, including stationary vanes 32 and rotating blades 34. The foamed solution continues through combustion section inlet 46 as indicated by the arrow, passing through turbine section 108 before exiting through exhaust section 70 where it is collapsed with an appropriate anti-foam.

While the methods of the present invention may be performed by simply pumping a predetermined quantity of foamed cleaning solution through the combustion turbine, in a preferred method samples of the collapsed foam 92 are taken and analyzed to determine the concentration of specific contaminants therein in order to estimate the completeness of the cleaning operation. Thus, when the concentration of contaminants in the collapsed foam drops below a predetermined level, the cleaning operation may be stopped.

Any foamed cleaning solution remaining within compressor section 102 may be removed by pumping a conventional foamed water rinse solution through manifold 10 and compressor section 102. An appropriate rinse comprises a foamed water solution to flush out all of the remaining cleaning solution. The foamed water solution should be pumped until no trace of the cleaning solution is detected in the collapsed liquid exiting the turbine. Following the rinse, the turbine may be cranked at a speed, e.g., at about 500–1500 RPM, preferably at about 1000 RPM, and for a time, typically about 10–30 minutes, sufficient to dry the compressor.

While the foregoing method will efficiently clean contaminants and residue found in the compressor section of combustion turbines, it is generally not effective in removing deposits formed in the turbine section. Fuels, particularly liquid fuels, contain additives to aid in the combustion process. Those additives, together with naturally occurring metals and metals picked up during the refining process, produce residues causing fouling of the combustion turbine blades. These combustion product residues, comprising metals, shellacs, varnishes and the like restrict the openings between the rotating blades and the stationary vanes, resulting in loss of power and efficiency in the turbine section. These deposits are typically not soluble in the mild, e.g., surfactant, cleaning solutions used to clean the compressor section. Thus, a second stronger cleaning solution is typically required.

Those skilled in the art are familiar with many appropriate cleaning solutions for removal of these deposits. Organic acids, particularly carboxylic acids having six or fewer carbon atoms, e.g., formic acid, acetic acid, hydroxyacetic acid, citric acid and mixtures and salts thereof may be appropriate for many contaminants. Other acids which may be appropriate for specific applications include salicylic acid, erythorbic acid, oxalic acid, gluconic acid and mixtures thereof.

For other contaminants, inorganic acids, particularly the mineral acids, e.g., sulfuric, phosphoric, nitric, and hydrochloric acid maybe preferred. Other acids include boric acid, ammonium bifluoride, ammonium fluoride, chromic acid, hydrofluoric acid, sulfamic acid and mixtures thereof may also be appropriate.

In some applications, complex acids, including ethylenediaminetetraacetic acid (EDTA), hydroxyethylenediaminetriacetic acid (HEDTA), salts of such acids and mixtures thereof, either alone or with other organic and inorganic, acids may be used. Other complex acids or chelates include acrylic acid/maleic acids copolymers, diethylenetriamine penta(methylene)phosphonic acid, hexapotassium hexamethylene diaminetetra(methylene)phosphonate, diethylenetriamine pentaacetic acid, phosphino polycarboxylic acid, hydroxy-ethylidene diphosphonic acid, nitrolotriacetic acid, sodium polymethacrylate, sodium salts of acrylic copolymers, sorbitol, tolyltriazole, benzotriazole, N-hydroxyethylenediamine triacetic acid, and mixtures and salts, particularly the sodium and ammonium salts, thereof.

Aqueous solutions of the selected acids, generally comprising about 2–20 percent acid, preferably about 5–10 percent acid, together with a conventional foaming agent and corrosion inhibitor are prepared and foamed as described above. Exemplary corrosion inhibitors include 3-alkoxy (12–15)-2-hydroxy-N-propyltrimethyl ammonium chloride, alkanolamides, alkyl pyridine quaternary amines, fatty imidazoline-1-hydroxyethyl 2-heptadecyl imidazoline, lauryl hydroxyethyl imidazoline, oxazolidine blends and mixtures thereof. Many corrosion inhibitors are available in the commercial market including A-300 and A-224 marketed by Hydrochem Industrial Services; Armohib 31 marketed by Akzo Nobel; Chronox 240, marketed by Baker Performance Chemicals; Miranol CS Concentrate, marketed by Rhodia; Rodine 2000, Rodine 2002, Rodine 31A and Rodine 95 marketed by Henkel; and Inhibitor 60Q and Inhibitor 60S marketed by Tomah. Those skilled in the art will be readily able to select the best acid and corrosion inhibitor for each application based upon the known or suspected contaminants.

These harsher cleaning solutions are then pumped through combustion section 106 and turbine section 108 in a line 56 attached to atomization chamber 104. Because these harsher cleaning solutions might damage the components, particularly the precisely defined surfaces of vanes 32 and blades 34, in compressor section 102, the compressor section must be isolated from contact with this second, foamed cleaning solution. The preferred method for achieving this isolation comprises the step of pumping a first foamed cleaning solution, typically an aqueous surfactant solution, through compressor section 102. By maintaining the flow of this first foamed cleaning solution through compressor section 102, the harsher second, foamed cleaning solution pumped via lines 56 through injectors 54 into combustion chamber 50 is prevented from flowing backward through inlet 46 into compressor section 102. Thus, while a first, foamed cleaning solution attacks the greases, oils, dirts and the like typically found in compressor section 102, a second, harsher foamed cleaning solution attacks the metals, oxides, varnishes and shellacs typically found in combustion section 106 and turbine section 108.

These foamed cleaning solutions exit turbine section 108 via exhaust section 70 as illustrated by the arrow in FIG. 2. Upon exiting turbine section 108, these foams must be broken back to liquids to facilitate recovery and disposal. Some foams will simply break with time after collection. FIG. 5 illustrates an exemplary manifold for use in breaking other foams. In the methods of the present invention, foam 90 exiting turbine section 108 through exhaust section 70 is sprayed with any conventional anti-foaming agent.

Sampling of the resulting liquid 92 may be periodically conducted during the cleaning operation for analysis of suspected contaminants. Upon determining that the concentration of one or more selected contaminants in the collapsed liquid has dropped below predetermined values, the cleaning operation can be concluded. The constituent contaminants, the degree of contamination, the selected solvents, the concentration thereof and the operating temperature all effect the cleaning time. In typical situations, acceptable results are achieved within 8–16 hours. Allowing time for shutdown and installation of the manifold 10 and associated equipment prior to cleaning, together with time for conducting a foamed water rinse followed by drying of the compressor and removal of the manifold, a foamed cleaning operation can typically be completed in less than 24 hours.

The foregoing description has been directed in primary part to a particular preferred embodiment in accord with the requirements of the Patent Statute and for purposes of explanation and illustration. It will be apparent, however, to those skilled in the art that many modifications and changes in the specifically described apparatus and methods may be made without departing from the true scope and spirit of the invention.

Therefore, the invention is not restricted to the preferred embodiment described and illustrated but covers all modifications which may fall within the scope of the following claims.

What is claimed is:

1. A manifold for temporarily blocking an air intake opening of a compressor section of a combustion turbine to facilitate cleaning thereof, comprising;
    a bonnet for completely covering an air intake opening of a compressor section of a combustion turbine;
    means disposed about a periphery of said bonnet for producing a temporary seal with said air intake opening; and
    at least one connection through said bonnet suitable for delivering through said air intake opening to said compressor section a stable foam prepared by foaming a liquid cleaning solution.

2. The manifold of claim 1 wherein said means for producing a temporary seal is an elastic band disposed about the periphery of said bonnet.

3. The manifold of claim 2 wherein said elastic band is inflatable to effect said seal when inflated.

4. The manifold of claim 3 wherein said elastic band is a tubular ring.

5. The manifold of claim 1 wherein at least a portion of said bonnet is flexible.

6. The manifold of claim 5 wherein said flexible portion of said bonnet is resiliently deformable.

7. The manifold of claim 5 wherein said flexible portion of said bonnet is comprised of a synthetic or natural elastomer.

8. The manifold of claim 1 wherein said bonnet is generally circular.

9. The manifold of claim 1 comprising a plurality of said connections symmetrically disposed about said bonnet radially inwardly from said sealing means.

10. A manifold for temporarily blocking an air intake opening of a compressor section of a combustion turbine to facilitate cleaning thereof, comprising:
    a bonnet for completely covering an air intake opening of a compressor section of a combustion turbine, said bonnet being generally circular in shape and wherein at least a portion of said bonnet is comprised of a flexible, deformable material;
    an inflatable, tubular member disposed about a periphery of said bonnet, said tubular member forming an inflatable ring for effecting a temporary seal with said air intake opening when inflated; and
    a plurality of connections through said bonnet suitable for delivering through said air intake opening to said compressor section, a stable foam prepared by foaming a liquid cleaning solution, said connections being symmetrically disposed about said periphery of said bonnet radially inwardly from said tubular member.

11. A manifold for temporarily blocking an air-intake opening of a compressor section of a combustion turbine to facilitate cleaning thereof, comprising;
    a manifold body having two substantially parallel sides for covering a radially outwardly opening, air intake of a compressor section of a combustion turbine;
    means disposed about each substantially parallel side of said manifold body for producing a temporary seal with said outwardly opening air intake; and
    at least one connection through said manifold body suitable for delivering through said air intake to said compressor section a stable foam prepared by foaming a liquid cleaning solution.

12. The manifold of claim 11 wherein said means for producing a temporary seal is a pair of elastic bands disposed about the periphery of said manifold along said substantially parallel sides.

13. The manifold of claim 12 wherein said elastic bands are inflatable to effect said seal when inflated.

14. The manifold of claim 11 wherein said manifold body is cylindrical.

15. The manifold of claim 14 wherein said means for producing a temporary seal are inflatable tubes disposed about the periphery of said manifold along said substantially parallel sides.

16. The manifold of claim 11 wherein said manifold body further comprises releasable fastening means disposed between said substantially parallel sides for forming said body into a cylindrical shape.

17. The manifold of claim 16 wherein said fastening means comprises a VELCRO-type fastener.

18. The manifold of claim 11 wherein at least a portion of said manifold body is flexible.

19. The manifold of claim 18 wherein said flexible portion of said manifold body is comprised of resiliently deformable elastomer.

20. The manifold of claim 11 comprising a plurality of said connections symmetrically disposed about said flexible body.

* * * * *